Feb. 12, 1957   P. V. WHITE ET AL   2,781,285
ELECTRICAL POWER CABLES OF THE SOLID TYPE
Filed March 16, 1954   2 Sheets-Sheet 1
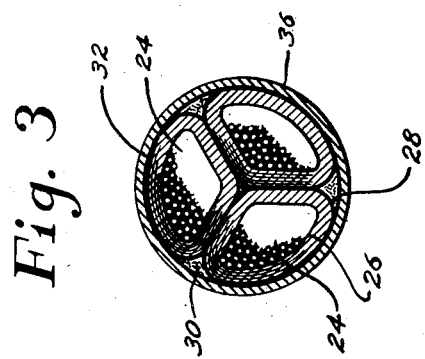
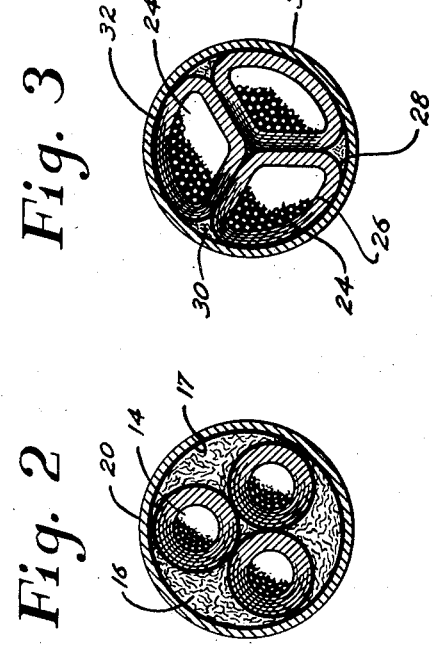
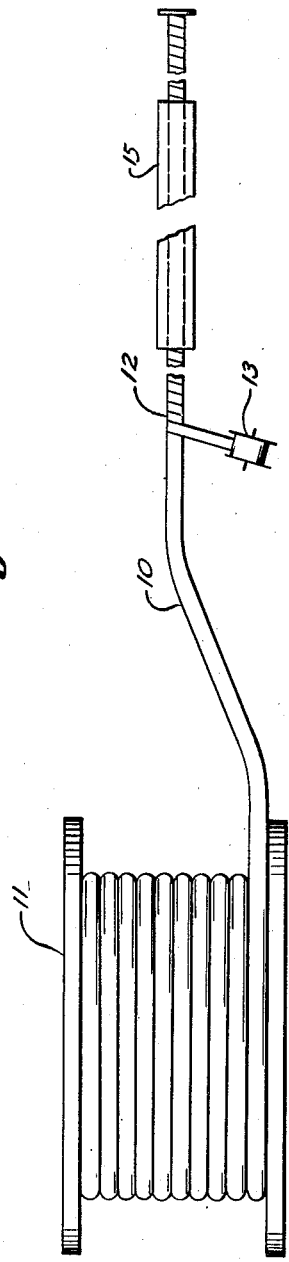
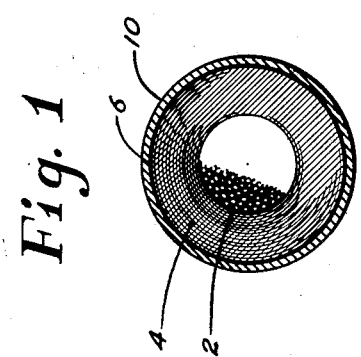
INVENTORS
PAUL V. WHITE
BY GUY N. EVEREST
James G. Bethell.

Feb. 12, 1957 P. V. WHITE ET AL 2,781,285
ELECTRICAL POWER CABLES OF THE SOLID TYPE
Filed March 16, 1954 2 Sheets-Sheet 2

INVENTORS
PAUL V. WHITE
BY GUY N. EVEREST
James G. Bethell

United States Patent Office 2,781,285
Patented Feb. 12, 1957

2,781,285

ELECTRIC POWER CABLES OF THE SOLID TYPE

Paul V. White, Waldwick, and Guy N. Everest, Ridgewood, N. J., assignors to The Okonite Company, Passaic, N. J., a corporation of New Jersey Application March 16, 1954, Serial No. 416,474

3 Claims. (Cl. 154—2.21)

This invention relates to an improvement in electric power cable systems and has for its primary object a new and improved method of manufacturing the same.

More specifically, the present invention relates to power cables of the so-called solid type, in which the several insulated conductors of the cable are enclosed in a tight-fitting metallic sheath. The conductor insulation is fluid-permeable and is saturated with fluid insulating material, such as oil, for instance.

One of the objects of our invention is to provide a method of manufacturing such power cables in which the cable is sheathed, evacuated, and impregnated while in extended or uncoiled position, thus insuring a much better and thorough evacuation and impregnation than by conventional methods wherein these operations are performed with the cable reeled.

In general, the present invention provides an improved method for the manufacture of electric power cables of the solid type in which the insulated conductors are drawn into a continuous length of metal tubing, such as aluminum, and, while in extended position, the cable and tubing are evacuated, and the conductor insulation thoroughly impregnated with fluid insulation—oil, for example—and finally the tubing, which is to constitute the sheath of the cable, is swaged into tight contact with the conductor insulation.

It is to be understood that the metallic tubing which we employ as a sheath is prefabricated in long lengths and is sufficiently flexible to enable it to be reeled without difficulty so as to permit the finished sheathed cable readily to be reeled. The tubing also is sufficiently strong to withstand the usual pressures developed or imposed when the cable is in service. We might mention that, prior to the present invention, it has been customary to employ lead for sheathing purposes, the lead being extruded about the cable. Not only may the solid insulation of the cable be deleteriously affected due to the extrusion temperatures, but it becomes necessary to stop the sheathing at relatively short intervals to renew the lead charge. During stoppage the lead at the dies cools, so that at these areas the sheath may be defective. By prefabricating the tubing which we employ for our sheath, all of these deleterious factors are eliminated. Then again, aluminum has a much better vibration resistance than lead, while the reduction in overall weight of the cable, as compared with lead-sheathed cables, facilitates handling, shipping, and installation, together with substantial savings in the expense involved in these operations.

The insulated single or multiple conductors, as the case may be, are manufactured in accordance with the latest techniques and methods employed in cable manufacture today for paper-insulated cables, up to the point where the cable is ready for drying and impregnating.

As above indicated, the insulated conductors in this condition are drawn into the prefabricated tubing, the tubing is sealed at each end, and the cable can then be electrically heated by passing current through the conductors. While in this condition, we completely evacuate the assembly, and, if desired, the overall drying time may be shortened by leakage drying, that is, by passing the dry gas through the cable.

Following the evacuation and drying operations, we introduce a fluid insulation, such as oil, for instance, with gas as a pressure medium if desired, into the assembly until a positive pressure is built up therein, thoroughly to impregnate the permeable insulation of the cable conductors.

Throughout these operations, the tubing is stretched out in a straight run, as distinguished from performing these operations while the cable is coiled upon a reel, thereby not only effecting considerable saving in impregnating time but promoting impregnation of the conductor insulation as well.

The cable is then passed through a swaging machine of conventional construction, to swage the tubing into tight contact with the insulation of the conductors and produce what is known in the electric cable industry as an electric power cable of the solid type.

The cable may now be coiled upon a reel, which may be just an ordinary conventional cable reel, and after testing is ready for shipment.

The type of cable capable of being produced by practicing our invention may be a single-conductor cable, multi-conductor cable, or a multi-conductor cable of the sector type.

In the accompanying drawings,

Figs. 1, 2, and 3 are cross-sections of three different types of cable sections constructed in accordance with our invention;

Fig. 4 illustrates the application of a protective covering to the prefabricated tubing;

Fig. 8 shows the cable coiled upon a reel ready for shipment.

Figure 5:
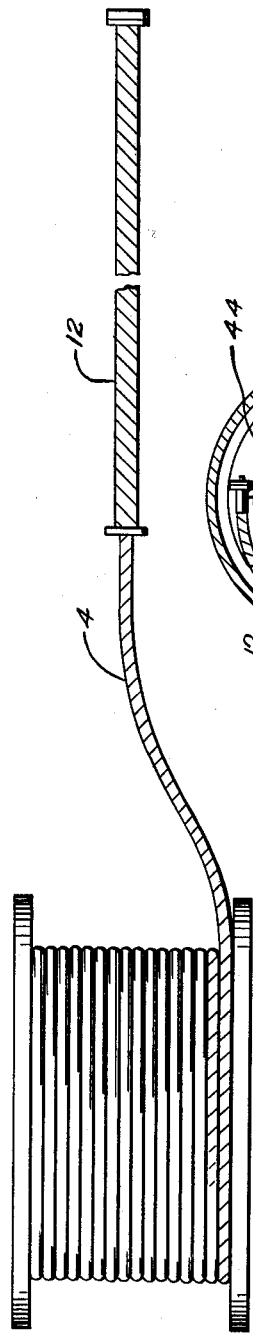
Fig. 5 illustrates diagrammatically the pulling of the conductor assembly into the prefabricated tubing.
Figure 7:
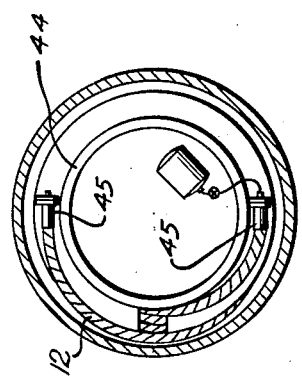
Fig. 7 shows the completed cable reeled and ready for shipment.
Figure 6:
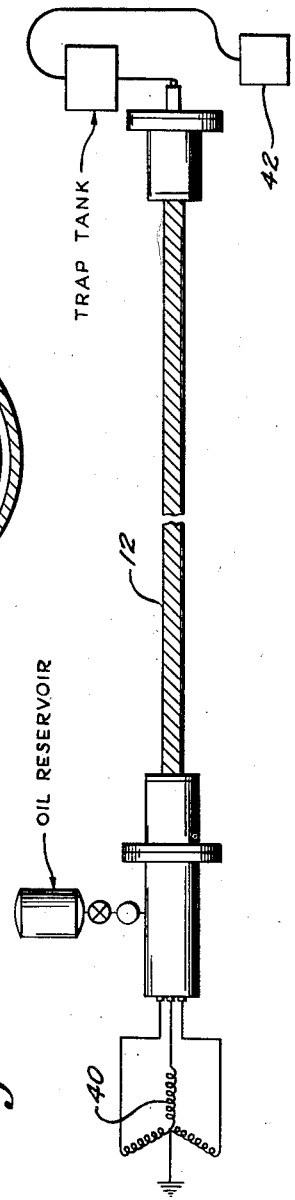
Fig. 6 illustrates diagrammatically the heating evacuating and impregnating of the cable.

As above noted, the cable may comprise but a single conductor, and in Fig. 1 such a cable has been illustrated. Referring to this view, 2 designates a conductor of the stranded type, which is insulated with gas-and-oil-permeable fibrous insulation 4, as paper, for example. About this insulation 4 is a metallic shielding tape 6, usually applied intercalated with a non-metallic tape. 10 designates the metal tubing constituting the sheath for the insulated conductor. We prefer to employ aluminum for this tubing inasmuch as with a wall thickness of only 0.125" such tubing is capable of withstanding internal pressures as high as 200 pounds per square inch and, at the same time, is capable of being reeled without difficulty. The internal diameter of the tubing is only slightly larger than the outside diameter of the conductor assembly, just enough that the conductor assmbly may be drawn into the tubing without difficulty. After the conductor assembly has been drawn into the tubing, the tubing is swaged into intimate contact with the conductor insulation.

12 designates a corrosion-protective tape of rubber, rubber-like, or synthetic compound, such as neoprene compound, for example, preferably applied in the form of a tape about the aluminum tubing 10, as illustrated in Fig. 4, for example, while the tubing is being drawn continuously from a reel 11 past a tape-applying head 13 and then through a continuous curing oven 15. This protective tape-covering is employed where the cable is to be buried directly in the earth.

In the cable of Fig. 2, we have illustrated a three-conductor cable. These conductors have been designated 14 and are facsimiles of the single conductor 2 of Fig. 1. The insulated conductors of Fig. 2 are cabled together in triangular form, which materially reduces electric losses in cable operation, and after the assembly has been rounded with fillers 16 of jute or some similar material, a metallic binding tape 17 is wrapped about the assembly. The assembly is then drawn into tubing 20, which corresponds to the tubing 10 of Fig. 1, this tubing eventually being swaged into intimate contact with the insulation of the conductors.

In the embodiment illustrated in Fig. 3, we have illustrated a multi-conductor cable employing conductors 24 of the sector type, each of which is insulated with insulation 26, which may be similar to the insulation 4 of Fig. 1. Metallic shielding tape 28 is wrapped about the insulation of each conductor. The conductors are cabled together, and to provide a round assembly, we employ fillers 30 of jute or any other suitable material. 32 designates a binding tape, which is wrapped about the assembly thus provided. This assembly is drawn into the prefabricated aluminum tubing 36, which may or may not be provided with a corrosion-protective covering. As will be understood, this tubing eventually is swaged into intimate contact with the conductor assembly.

In making up the insulated conductors of Figs. 1, 2, and 3 above described, it will be understood that the customary factory techniques are employed, and then the conductor assembly is pulled into prefabricated aluminum tubing 10, 20, or 36, as the case may be. In this operation or step, the tubing is stretched out in a substantially straight run and in lengths as long as factory facilities will permit, say, for example, 1,000 feet or even longer. After the conductor assembly has been drawn into the tubing, the tubing ends are sealed and then, through the medium of a current transformer 40, for example, current is passed through the conductor or conductors of the conductor assembly to heat the same, and at the same time a vacuum is drawn on the assembly by means of a vacuum pump 42, so as not only thoroughly to dry but evacuate the assembly. Fluid insulation, such as oil, for example, is then introduced, gas being employed as a pressure medium, if desired. This step is continued until a positive pressure is built up within the assembly. The sheathed assembly is then passed through a suitable swaging machine, to swage the tubing into intimate contact with the conductor assembly, following which operation the entire assembly is coiled upon a reel 44 and tested and the ends are suitably sealed with splicing sleeves, such as 45. The cable is then ready for shipment.

At new sites, it is only necessary, of course, to draw the cable off its reel and bury it directly in the earth. At old installation sites, it may be drawn into an existing conduit or duct, after which the necessary electrical connections will be made, as will be understood by those versed in this art.

From all of the foregoing it will appear that our invention provides an electric power cable of the solid type in which the cable is evacuated and impregnated after it has been drawn into the aluminum tubing constituting the cable sheath and while stretched out in a long run. This insures a much more thorough evacuation and impregnation of the cable than where evacuation and impregnation are effected with the cable in reeled condition.

What we claim is:

1. In the manufacture of electric power cables the method which comprises applying oil-and-gas-permeable insulation about a cable conductor; drawing the assembly thus provided into metal tubing, which is extended in a long run; with the tubing and its contained conductor assembly thus extended, sealing the ends of the tubing, passing current through the cable conductor to heat the same, evacuating the assembly, and filling the evacuated assembly with fluid insulation; finally swaging the tubing into intimate contact with the conductor assembly, and then reeling the cable thus provided upon a reel.

2. In the manufacture of electric power cables the method which comprises applying oil-and-gas-permeable insulation about a cable conductor; drawing the assembly thus provided into metal tubing, which is extended in a long, straight run; with the tubing and its contained conductor assembly thus extended, sealing the ends of the tubing, passing current through the cable conductor to heat the same, evacuating the assembly, and filling the evacuated assembly with oil; finally swaging the tubing into intimate contact with the conductor assembly, and then reeling the cable thus provided upon a reel.

3. In the manufacture of electric power cables the method which comprises applying oil-and-gas permeable insulation about a cable conductor; drawing the assembly thus provided into metal tubing, which is extended in a long, straight run; with the tubing and its contained conductor assembly thus extended, sealing the ends of the tubing, passing current through the cable conductor to heat the same, evacuating the assembly, and filling the evacuated assembly with gas; finally swaging the tubing into intimate contact with the conductor assembly, and then reeling the cable thus provided upon a reel.

References Cited in the file of this patent

UNITED STATES PATENTS

| Number | Name | Date |
|---|---|---|
| 544,373 | Patterson et al. | Aug. 13, 1895 |
| 544,374 | Patterson | Aug. 13, 1895 |
| 2,149,772 | Hunter et al. | Mar. 7, 1939 |
| 2,251,826 | Fogg | Aug. 5, 1941 |
| 2,386,119 | Jack | Oct. 2, 1945 |
| 2,498,494 | Hickernell | Feb. 21, 1950 |
| 2,658,014 | Morrison | Nov. 3, 1953 |
| 2,689,039 | Reed | Sept. 14, 1954 |